June 7, 1966          A. C. MILLER          3,255,379
APPARATUS AND METHOD FOR GENERATING LIGHT
Filed July 26, 1963          2 Sheets-Sheet 1
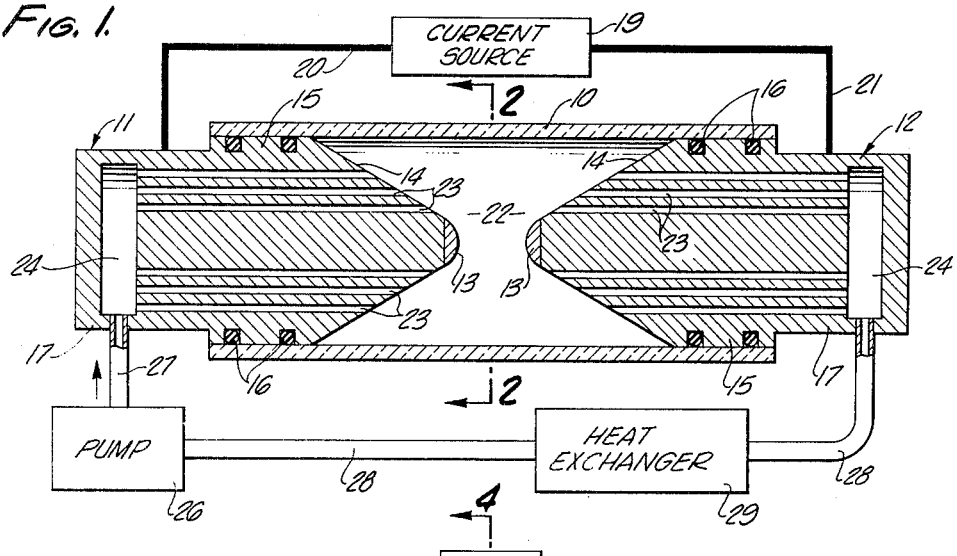
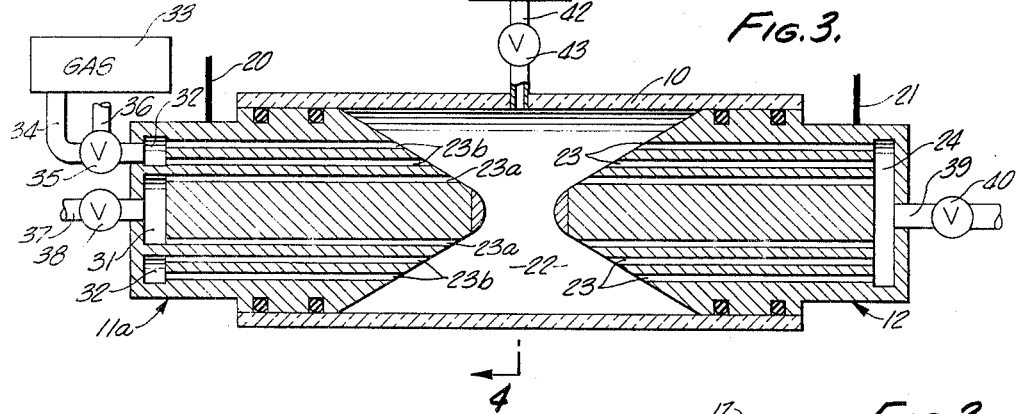
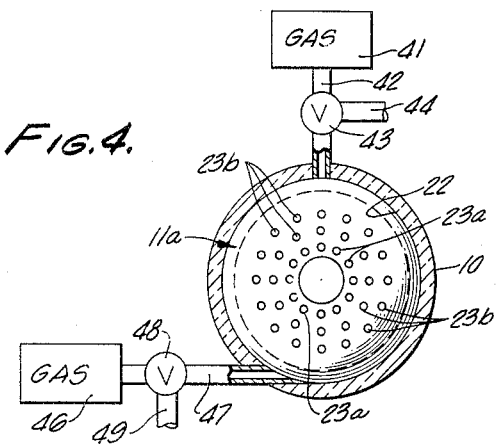
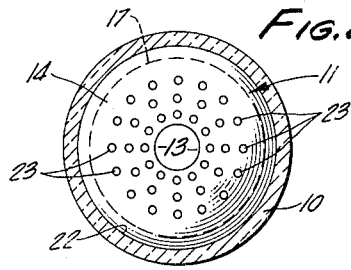
INVENTOR.
ARTHUR C. MILLER
BY *Jensen & Carr*
ATTORNEYS June 7, 1966  A. C. MILLER  3,255,379
APPARATUS AND METHOD FOR GENERATING LIGHT
Filed July 26, 1963  2 Sheets-Sheet 2
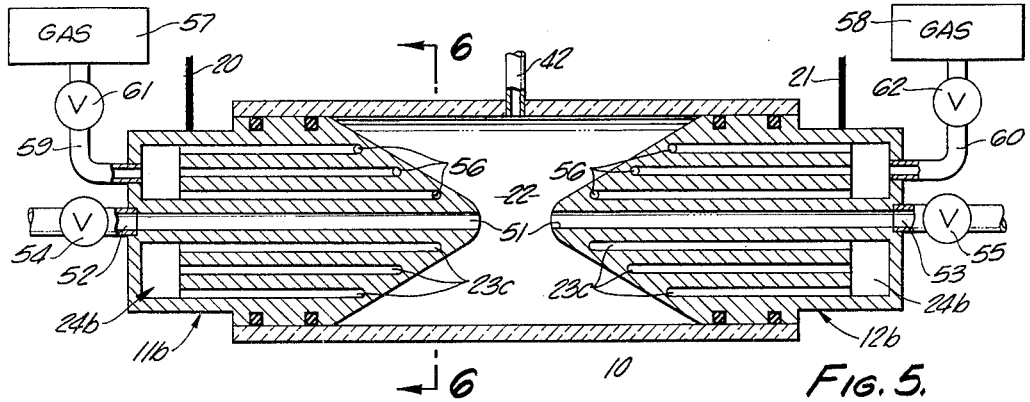
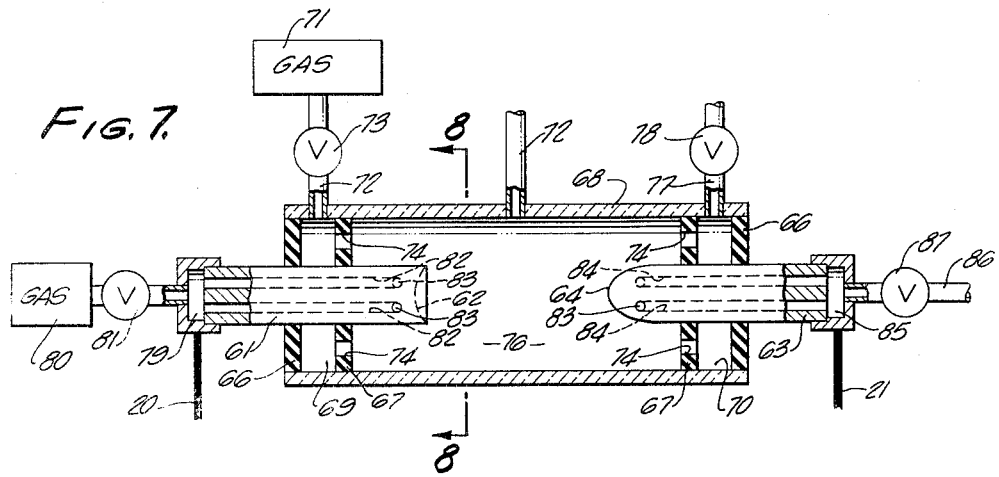
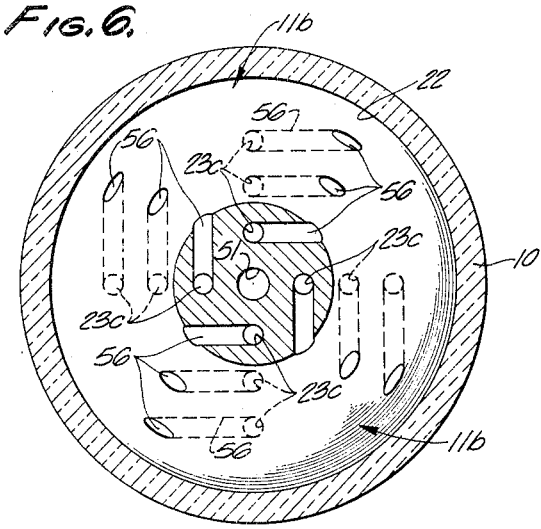
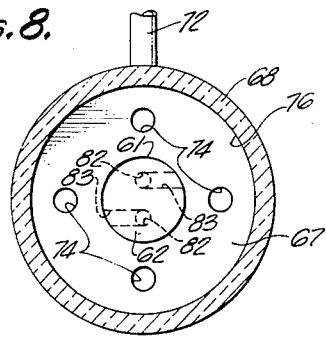
INVENTOR.
ARTHUR C. MILLER
BY [signature]
ATTORNEYS 3,255,379
APPARATUS AND METHOD FOR GENERATING LIGHT
Arthur C. Miller, Anaheim, Calif., assignor, by mesne assignments, to Giannini Scientific Corporation, Amityville, N.Y., a corporation of Delaware
Filed July 26, 1963, Ser. No. 297,903
13 Claims. (Cl. 315—111)

This invention relates to an apparatus and method for generating light. More particularly, the invention relates to a light source of the electric-arc type, wherein the electrodes are cooled by means of a gas which is passed through the arc chamber.

Various light sources have previously been proposed in which gas is passed through the arc chamber, the gas performing one or more of the following functions, and others: stabilizing the arc, constricting the arc, cooling the envelope, maintaining the envelope wall clean, and changing the characteristics of the emitted light. However, such light sources have been generally characterized, particularly in the case of high-power sources wherein the electrodes are non-consumable, by the necessity of passing cooling water through the electrodes in order to prevent melting thereof. The requirement for continuous circulation of cooling water is a distinct complicating factor which increases substantially the cost of the apparatus and the difficulty of operating the same. There are, for example, numerous places where it is convenient to supply sufficient electrical power for a high-power light source of the arc type, but in which it is inconvenient or impossible to deliver water for cooling of the electrodes. As one illustration, reference is made to generator-powered search lights of the type employed in some areas of the country to herald the opening of a new business. Such units are completely self contained from an electrical standpoint, but have no provision for circulation of cooling water.

In view of the above and other factors relative to high-power light sources of the electric-arc type, particularly those sources in which the electrodes are non-consumable, it is a primary object of the present invention to provide light sources, and methods of generating light, in which there is no requirement for circulation of water or other coolant other than the gas which is supplied to the arc chamber for purposes including stabilization of the arc and determination of the characteristics of the emitted light.

This and other objects will become apparent from the following detailed description taken in connection with the accompanying drawings in which:

FIGURE 1 is a schematic longitudinal central sectional view of a light source constructed in accordance with a first embodiment of the present invention;

FIGURE 2 is a transverse sectional view taken on line 2—2 of FIGURE 1;

FIGURE 3 is a longitudinal central sectional view illustrating, in schematic form, a second embodiment;

FIGURE 4 is a transverse section on line 4—4 of FIGURE 3;

FIGURE 5 is a longitudinal central sectional view illustrating schematically a third embodiment of the invention;

FIGURE 6 is an enlarged transverse sectional view taken on line 6—6 of FIGURE 5 and showing the generally tangential relationship between the gas-delivery passages and the envelope which defines the arc chamber;

FIGURE 7 is a schematic longitudinal view, primarily in section, illustrating a light source of the consumable-electrode type, in combination with various means for passing through the arc chamber; and FIGURE 8 is a transverse section on line 8—8 of FIGURE 7.

Referring first to the embodiment of FIGURES 1 and 2, the light source is illustrated schematically to comprise a hollow cylinder or tube 10 formed of suitable transparent or light-transmissive insulating material such as quartz, fused silica or the like. Inserted into opposite ends of the tube 10 are non-consumable electrodes 11 and 12 formed of a refractory metal such as tungsten. Alternatively, the electrodes may be formed of copper or the like, and may each be provided with an arcing tip 13 which may be thoriated tungsten.

The electrodes 11 and 12 are illustrated as having opposed conical portions 14 which merge with cylindrical portions 15, the latter engaging the interior surface of the envelope 10 and being provided with suitable sealing means such as the indicated O-rings 16. Portions of the electrodes 11 and 12 may protrude beyond the ends of the tube or envelope 10, and may be reduced in diameter as indicated at 17.

A current source, indicated schematically at 19, is connected through leads 20 and 21 to the electrodes 11 and 12, respectively. Such source normally comprises a suitable source of high-current low-voltage D.C. power, although it may comprise a source of alternating power. Upon application of the current source 19, an arc may be initiated between the arcing ends 13 of the electrodes 11 and 12 and within the arc chamber 22, such chamber being defined within the envelope 10 and between the opposed conical surfaces 14. The arc may be initiated by any suitable means, such as momentary application of a high-voltage pulse, or by moving the electrodes together and then apart.

According to the present invention, gas is passed through the electrodes and then through the arc chamber 22 in such manner as to effect cooling of the electrodes, as well as to provide useful functions in the chamber 22 such as cooling the envelope 10 and maintaining it relatively clean, changing the characteristics of the light emitted from the arc, etc. More specifically, a large number of bores 23 are formed longitudinally through each electrode 11 and 12, in closely-spaced relationship and generally parallel to the common axis of the envelope and electrodes. The bores are shown in FIGURE 2 as being arranged in a plurality of concentric circles around the axis of the apparatus, although it is to be understood that the bores may also be staggered or offset.

The bores in each electrode 11 and 12 communicate with a common chamber or header 24 adapted to conduct gas thereto or therefrom. In the illustrated system, the outlet of a suitable pump 26 is connected through a conduit 27 to the header 24 in electrode 11. A second conduit 28 is connected from header 24 in electrode 12, and through a heat exchanger 29, to the inlet of the pump 26. Thus, gas is pumped from the outlet of pump 26 through conduit 27 to the associated header 24, thence through all of the bores 23 in electrode 11 to the arc chamber 22, thence through all of the bores 23 in the electrode 12 to header 24, and thence through conduit 28 and heat exchanger 29 back to the inlet of the pump. The heat exchanger may be a suitable air-cooled or water-cooled type adapted to cause the gas to be relatively cold at the time it enters the pump 26.

Proceeding next to a description of the method relative to the embodiment of FIGURES 1 and 2, the entire system is purged of air and filled with a suitable gas, such as argon, nitrogen, xenon, or the like, at a relatively high pressure such as ten atmospheres or more. Pump 26 is then employed to circulate the gas through the above-described circuit. Current source 19 is then applied, and the arc initiated as stated above, the arc extending between the tips 13 of the opposed electrodes 11 and 12. The arc current may be on the order of tens or hundreds of amperes, at a voltage determined primarily by the spacing between the electrode tips 13.

Preferably, current source 19 is a D.C. source, and the electrode 11 is made positive. This is because the positive electrode is normally the hotter one, so that it is advantageous to pump relative cold gas from the cooler or heat exchanger 29 directly through the passages 23 in such relatively hot electrode. It is emphasized, however, that a substantial cooling action is also effected in the electrode 12 by the gas which is passed at high velocity through the arc chamber 22. It is also emphasized that the pump 26 should have a relatively high capacity, causing the gas to flow at high velocity through the passages 23 in the several electrodes.

*Embodiment of FIGURES 3 and 4*

Except for the various gas connections and flow circuits, the apparatus of FIGURES 3 and 4 may be identical to that described relative to FIGURES 1 and 2. The electrode 11a, FIGURE 3, is a modification of the electrode 11 described heretofore in that the header chamber 24 is omitted and replaced by two chambers 31 and 32. Chamber or header 31 is circular in shape and communicates only with those passages 23a which are in the innermost circle thereof, as shown in FIGURE 4. The chamber or header 32, on the other hand, is annular in shape and communicates only with those passages 23b which are in the outermost circles.

A gas source 33 communicates through a conduit 34 and a valve 35 with the annular chamber or header 32. Such valve 35 is a two-position valve adapted when in one position to effect communication between source 33 and header 32, and when in another position to effect communication between header 32 and the ambient atmosphere via a vent or outlet 36.

A conduit 37 communicates with the central header 31, having a valve 38 therein which may be shifted to a closed position blocking flow of gas through the conduit 37. A conduit 39 communicates with the chamber or header 24 in electrode 12, such conduit also having a shut-off valve 40 therein.

Referring particularly to FIGURE 4, an additional gas source 41 is shown as being connected through a conduit 42 with the central portion of arc chamber 22, the conduit being disposed radially of the chamber. A three-position valve 43 is interposed in the conduit 42. Valve 43 is adapted when in a first position to block flow of gas into or out of the chamber 22, when in a second position to effect communication between source 41 and the chamber 22, and when in a third position to effect communication between the chamber 22 and the ambient atmosphere via a vent or outlet 44.

An additional gas source 46 is illustrated (FIGURE 4) as communicating through a conduit 47 with the chamber 22, the conduit being arranged tangentially of the chamber. A valve 48 is interposed in the conduit, being of the three-position type as described relative to valve 43. Thus, valve 48 has a first position blocking flow of gas through conduit 47, a second position effecting communication between source 46 and chamber 22, and a third position effecting communication between chamber 22 and the ambient atmosphere via a vent or outlet 49.

Proceeding next to a description of the method relative to the embodiment of FIGURES 3 and 4, let it first be assumed that all of the valves 40, 43 and 48 are turned to positions blocking flow of gas through the associated conduits 39, 42 and 47. Electrode 12 is then, in effect, blind. Valve 35 is turned to its position permitting rapid flow of gas (such as argon, xenon, nitrogen, etc.) from source 33 to the annular header 32, and valve 38 is turned to its open position permitting outflow of gas from header 31 to the ambient atmosphere. It is to be understood that (in all instances) the gas may be cooled and recirculated as described relative to FIGURE 1, instead of being vented to the atmosphere. The current source 19 is applied and an arc is initiated, the polarity preferably being such that lead 20 is positive.

The gas flows rapidly from source 33 to the outer longitudinal passages 23b and into the chamber 22, from whence it flows outwardly through passages 23a and header 31 to the atmosphere. Such rapidly-circulating gas effects sufficient cooling of anode 11a to eliminate the necessity for water cooling the same. Electrode 12, being the cathode, remains relatively cool in comparison to the anode, although it may (particularly at higher powers) be suitably cooled as by flow of gas through the passages 23 therein. To achieve the latter result, valve 40 is opened sufficiently to permit some of the gas entering through passages 23b to pass outwardly through passages 23 in the electrode 12.

If desired, the conduit 37 may be connected to a gas source and the conduit 34 may be vented to the ambient atmosphere. In such event, gas flows inwardly through passages 23a and outwardly through passages 23b.

The gas may also be introduced into chamber 22 from one or the other of sources 41 and 46, or from both of such sources, passing outwardly through one or both electrodes 11a and 12. Thus, either or both of the valves 43 and 48 may be turned to their positions effecting communication between sources 41 and 46 and chamber 22. Such communication is achieved while valves 38 and 40 are in their flow positions permitting venting of gas to the ambient atmosphere, and while valve 35 is turned to its position effecting communication between header 32 and vent 36. Thus, gas flows inwardly from either or both of sources 41 and 46 and outwardly through the various longitudinal passages 23, 23a and 23b in the electrodes 12 and 11a.

In accordance with an additional manner of performing the method, either or both of valves 43 and 48 are turned to their positions effecting communication between chamber 22 and the vent conduits 44 and 49, flow of gas from sources 41 and 46 being blocked. Valve 35 is then turned to its position effecting communication between source 33 and annular chamber 32, so that gas flows inwardly through passages 23b to the chamber 22 and then vents through the outlets 44 and/or 49. Furthermore, either or both of conduits 37 and 39 may be connected to suitable gas sources, and valves 38 and 40 opened so that gas flows inwardly through all of the passages 23, 23a and 23b.

*Embodiment of FIGURES 5 and 6*

The general electrode and envelope configurations shown in FIGURES 5 and 6 are the same as were shown and described relative to FIGURES 1 and 2, except as specifically noted. The passages 23c in the respective electrodes 11b and 12b communicate with the arc chamber 22 in a generally tangential manner, as shown in FIGURE 6. Thus, the inflowing gas is caused to flow vortically, in the chamber 22, about the longitudinal axis of the apparatus. The gas then discharges through central (axial) passages 51 which are provided in at least one of the electrodes 11b and 12b. Such central passages extend through the header chambers 24b and connect to conduits 52 and 53 having shutoff valves 54 and 55 interposed therein.

In order to simplify the drawing, the number of passages 23c illustrated in FIGURES 5–6 is smaller than the number shown relative to the embodiment of FIGURES 1–2. Desirably, there are numerous, closely-spaced passages 23c.

The tangential discharge portion of each passage 23c is indicated by the reference numeral 56. It is emphasized that the discharge portions 56 in the opposed electrodes 11b and 12b are so arranged that vortical flow of gas in the chamber 22 is augmented or mutually aided, the gas from each electrode entering in a clockwise manner as viewed in FIGURE 6.

Suitable gas sources 57 and 58 are provided and are connected, respectively, through conduits 59 and 60 with the header chambers 24b of electrodes 11b and 12b. Such conduits have shut-off valves 61 and 62 therein.

Proceeding next to a description of the method relative to the embodiment of FIGURES 5 and 6, the valves 61 and 62 are opened, to permit inflow of gas through the chambers 24b and the various passages 23c (including tangential portions 56 thereof) to arc chamber 22. The gas then flows vortically in chamber 22 and outwardly through the passages 51 in one or both of the electrodes 11b and 12b, depending upon the positions of the valves 54 and 55.

The flowing gas cools the electrodes and, in addition, stabilizes and constricts the arc which is maintained between the electrodes due to application of the current source 19 through leads 20 and 21. Furthermore, the footpoints of the arc are rapidly rotated by the vertically-flowing gas, preventing such footpoints from burning into the electrodes and damaging the same.

It is to be understood that one of the outflow valves, for example valve 55, may be closed. All of the gas then flows outwardly through the passage 51 in the electrode 11b. In such instances, it is preferred that the lead 20 from source 19 be the positive lead, making electrode 11b an anode. It is also to be understood that the passage 51 in electrode 12b may be omitted, so that such electrode will be blind at the central portion thereof. In such instance, the electrode 11b is again, preferably, made the anode.

It is also pointed out that gas sources may be connected to the central portion of the envelope, either radially or tangentially, as indicated at 42 and described relative to sources 41 and 46 in FIGURE 4.

The gas employed in the embodiment of FIGURES 5–6 may be the same as described previously, for example argon, nitrogen, or xenon. Furthermore, the pressures may be the same, such as ten atmospheres or higher. The arc current may be on the order of tens to hundreds of amperes, and the voltage on the order of tens to hundreds of volts, depending primarily on the electrode spacing. As previously described, the gas from the outlets 52 and 53 may be cooled and recirculated to the inlets 59 and 60.

*Embodiment of FIGURES 7 and 8*

FIGURES 7 and 8 illustrate an embodiment in which the electrodes are carbon instead of metal. The positive carbon is indicated at 61, having a dished or cored end 62 forming a crater. The negative carbon 63 has a rounded end 64, being disposed opposite and coaxial with the positive carbon.

The carbons 61 and 63 project through insulating outer walls 66 and inner walls 67 which are provided in opposite ends of a tubular envelope 68 formed of quartz, fused silica, or the like. The outer and inner walls 66 and 67 are spaced apart to form header chambers 69 and 70.

Gas is delivered to the chamber 69 from a gas source 71, by means of a conduit 72 having a shut-off valve 73 therein. Gas entering the header chamber 69 flows through a plurality of circumferentially-spaced ports 74 (in one inner wall 67) to the arc chamber 76 between the electrodes, thence through corresponding ports 74 (in the remaining inner wall 67) to the header chamber 70, thence through a conduit 77 and shut-off valve 78 to the ambient atmosphere.

Alternatively, or additionally, gas is delivered through the electrodes or carbons 61 and 63. Thus, a header 79 is provided at the outer end of the positive carbon 61, for feeding of gas from a source 80 through a valve 81 to passages 82 which are formed longitudinally through the carbon. The inner ends of the passages 82 are illustrated in FIGURE 8 as being generally tangential to the arc chamber 76, as shown at 83. Corresponding passages 84 are provided in negative carbon 63, for outflow of gas through a header 85 and conduit 86 to the ambient atmosphere, there being a valve 87 interposed in the conduit. The inner ends 83 of the passages 84 in the negative carbon are tangential to the chamber, similarly to the showing of FIGURE 8.

The leads 20 and 21 shown in FIGURE 1 are connected to the positive and negative carbons 61 and 63, respectively.

Proceeding next to a description of the method relative to the embodiment of FIGURES 7 and 8, let it first be assumed that the valves 73 and 78 are closed, and valves 81 and 87 open. Gas then flows inwardly through the header 79 and passages 82 to the arc chamber 76, the gas flowing vortically around the arc which is struck between the electrodes 61 and 63 after application of the current source. The gas cools the electrodes, and provides other useful functions including changing the characteristics of the emitted light. The gas may be the same as previously described, at the same or similar pressures.

After passing through the arc chamber 76, the gas flows outwardly through the passages 84 and header 85 to conduit 86, where it may be discharged to the ambient atmosphere or else cooled, filtered and recirculated.

Additionally, or alternatively, the valves 73 and 78 may be opened so that gas flows from source 71 through the header 69 and ports 74 to the arc chamber 76, the gas discharging through ports 74, header 70 and conduit 78 to the atmosphere or to a suitable recirculating means.

Suitable means, not shown, are provided to effect a certain amount of feeding of the electrodes, to maintain the proper spacing therebetween.

The foregoing detailed description is to be clearly understood as given by way of illustration and example only, the spirit and scope of this invention being limited solely by the appended claims.

I claim:

1. A light source, comprising
   first and second non-consumable metal electrodes having arcing end portions disposed opposite each other along a common axis,
      said first electrode having a large number of small-diameter passages formed therein and extending to the region of said arcing portion of said first electrode,
   light-transmissive wall means to define a chamber in which said arcing end portions are disposed,
   means to introduce gas into said chamber through some of said small-diameter passages in said first electrode,
   means to discharge gas from said chamber through other of said small-diameter passages in said first electrode, and
   means to maintain an electric arc in said chamber between said electrodes.

2. The invention as claimed in claim 1, in which
   means are provided to prevent flow of gas through said second electrode.

3. Apparatus for generating light, which comprises
   wall means to define a chamber,
      at least a portion of said wall means being light transmissive, first and second non-consumable metal electrodes having arcing end portions disposed opposite each other and in said chamber,
at least one of said electrodes having a large number of small-diameter passages formed therethrough,
said passages communicating with said chamber in such manner as to effect vortical flow of gas in said chamber about an axis extending between said arcing end portions,
outlet means to discharge gas from said chamber,
means to maintain a high-current electric arc in said chamber betwen said arcing end portions, and
means to effect rapid flow of gas through said small-diameter passages into said chamber and out said outlet means.

4. The invention as claimed in claim 3, in which said outlet means comprises a longitudinal passage formed centrally through said one electrode.

5. The invention as claimed in claim 3, in which the other of said electrodes also has a large number of small-diameter passages formed therethrough and communicating with said chamber in such manner as to effect vortical flow of gas about said axis, and in which
means are provided to introduce gas into said chamber through said small-diameter passages in said other electrode.

6. A light source, comprising:
wall means to define an arc chamber,
at least a portion of said wall means being formed of transparent material,
first and second electrodes having opposed arcing portions disposed in said chamber,
means to maintain an electric arc in said chamber between said arcing portions,
means to introduce gas continuously into said chamber, and
means to discharge gas continuously from said chamber,
said last-named means comprising a substantial number of gas-outlet openings provided in at least one of said electrodes radially-outwardly of said arcing portion thereof.

7. A method of generating high-intensity light, which comprises:
defining a chamber a wall of which is a surface of revolution about a central axis,
providing first and second electrodes having opposed arcing portions located adjacent said axis,
maintaining an electric arc in said chamber between said arcing portions,
introducing gas continuously and generally tangentially into said chamber to thereby effect vortical flow of said gas in said chamber about said axis,
discharging gas from said chamber at points located radially-outwardly of said arcing portion of at least one of said electrodes, and
transmitting light from said chamber through a portion of the wall thereof.

8. The invention as claimed in claim 7, in which said method comprises discharging gas through a substantial number of outlet passages provided in said one electrode, the intake ends of said passages being located radially-outwardly of said arcing portion of said one electrode.

9. A light source, comprising:
wall means to define an arc chamber,
at least a portion of said wall means being formed of transparent material,
first and second electrodes having opposed arcing portions disposed in said chamber,
said arcing portions being free of central gas-outlet openings,
means to maintain an electric arc in said chamber between said arcing portions,
means to introduce gas continuously into said chamber, and
means to discharge gas continuously from said chamber,
said last-named means comprising a substantial number of gas-outlet openings provided in at least one of said electrodes radially-outwardly of said arcing portion thereof.

10. A method of generating high-intensity light, which comprises:
defining a chamber a wall of which is a surface of revolution about a central axis,
providing first and second electrodes having opposed arcing portions located adjacent said axis,
said arcing portions being free of outlet openings at said axis,
maintaining an electric arc in said chamber between said arcing portions,
introducing gas continuously and generally tangentially into said chamber to thereby effect vortical flow of said gas in said chamber about said axis,
discharging gas from said chamber at points located radially-outwardly of said arcing portion of at least one of said electrodes, and
transmitting light from said chamber through a portion of the wall thereof.

11. Apparatus for generating light, comprising:
first and second electrode means,
at least one of said electrode means having a large number of small-diameter passages formed therein for passage of gas therethrough,
wall means to define a chamber in which the arcing end portions of said electrode means are disposed,
at least part of said wall means being transparent,
said wall means having an opening therein,
means to maintain an electric arc in said chamber between said arcing end portions of said electrode means, and
means to effect flow of gas through said chamber by means of a flow circuit which includes said small-diameter passages and also includes said opening in said wall means,
said last-named means including means to pass gas into said chamber through said small-diameter passages, and
means to discharge gas from said chamber through said opening in said wall means.

12. Apparatus for generating light, comprising:
first and second electrode means,
at least one of said electrode means having a large number of small-diameter passages formed therein for passage of gas therethrough,
wall means to define a chamber in which the arcing end portions of said electrode means are disposed,
at least part of said wall means being transparent,
said wall means having an opening therein,
means to maintain an electric arc in said chamber between said arcing end portions of said electrode means, and
means to effect flow of gas through said chamber by means of a flow circuit which includes said small-diameter passages and also includes said opening in said wall means,
said last-named means including means to pass gas into said chamber through said opening in said wall means and to discharge gas from said chamber through said small-diameter passages.

13. Apparatus for generating light, comprising:
first and second electrode means,
both of said electrode means having a large number of small-diameter passages formed therein for passage of gas therethrough, wall means to define a chamber in which the arcing end portions of said electrode means are disposed, at least part of said wall means being transparent, said wall means having an opening therein, means to maintain an electric arc in said chamber between said arcing end portions of said electrode means, and means to effect flow of gas through said chamber by means of a flow circuit which includes said small-diameter passages and also includes said opening in said wall means, said last-named means comprising means to introduce gas into said chamber through said small-diameter passages in both of said electrode means and to discharge gas from said chamber through said opening in said wall means.

References Cited by the Examiner
UNITED STATES PATENTS

| | | | |
|---|---|---|---|
| 2,171,359 | 8/1939 | Gertler | 313—22 |
| 2,179,929 | 11/1939 | Hansell | 313—30 |
| 2,972,698 | 2/1960 | Dana et al. | 313—231 |
| 3,005,931 | 3/1960 | Dandl | 315—111 |
| 3,064,153 | 11/1962 | Gage | 315—11 X |

GEORGE N. WESTBY, *Primary Examiner.*

S. D. SCHLOSSER, *Assistant Examiner.*